US006851729B2

(12) United States Patent
Gibson (10) Patent No.: US 6,851,729 B2
(45) Date of Patent: Feb. 8, 2005

(54) TUBE FITTING FOR MEDIUM PRESSURE APPLICATIONS

(75) Inventor: James David Gibson, Huntsville, AL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/262,467

(22) Filed: Sep. 30, 2002

(65) Prior Publication Data

US 2003/0107216 A1 Jun. 12, 2003

Related U.S. Application Data

(60) Provisional application No. 60/338,369, filed on Dec. 7, 2001.

(51) Int. Cl.[7] .............................. F16L 19/06; F16L 19/00
(52) U.S. Cl. ....................... 285/341; 285/342; 285/343; 285/348; 285/353; 285/382.7
(58) Field of Search ................................. 285/341, 342, 285/343, 348, 382.7, 353, 384, 385, 389, 354

(56) References Cited

U.S. PATENT DOCUMENTS

| | | | | | |
|---|---|---|---|---|---|
| 2,391,900 | A | * | 1/1946 | Hobbs | 285/341 |
| 2,393,252 | A | * | 1/1946 | Kaysing | 277/622 |
| 2,463,707 | A | * | 3/1949 | Matousek | 285/341 |
| 2,484,815 | A | | 10/1949 | Crawford | |
| 2,749,152 | A | | 6/1956 | Courtot | |
| 3,075,793 | A | | 1/1963 | Lennon et al. | |
| 3,103,373 | A | | 9/1963 | Lennon et al. | |
| 3,215,457 | A | | 11/1965 | Teeters | |
| 3,402,949 | A | | 9/1968 | Mahoney | |
| 3,433,508 | A | * | 3/1969 | Teeters | 285/341 |
| 3,445,128 | A | | 5/1969 | Teeters | |
| 3,499,671 | A | | 3/1970 | Osborne | |
| 3,584,900 | A | | 6/1971 | Lennon | |

(List continued on next page.)

FOREIGN PATENT DOCUMENTS

| | | | | |
|---|---|---|---|---|
| EP | 0 678 589 B1 | | 7/1999 | |
| FR | 2 575 265 A1 | * | 11/1985 | ................. 285/341 |

OTHER PUBLICATIONS

Parker–Hannifin Bulletin 4230–B15.4 entitled "Engineering Report"—Analytical Tube Fittings. Applicants request the Examiner to consider this reference as prior art under 102 (a), however, Applicants respectfully reserve the right to supplement this information Disclosure Statement and take a contrary position should it be necessary.

Parker–Hannifin Drawing MS–1143, dated Nov. 2, 1979.

Parker–Hannifin Drawing for Original Assembly Drawings for Inverted End. Applicants request the Examiner to consider this reference as prior art under 102 (a), however, Applicants respectfully reserve the right to supplement this Information Disclosure Statement and take a contrary position should it be necessary.

(List continued on next page.)

Primary Examiner—James M. Hewitt
(74) Attorney, Agent, or Firm—John A. Molnar, Jr.

(57) ABSTRACT

A fitting for the connection of a tubing end. The fitting includes a body having a bore with an internally-threaded opening which extends to a seating surface, and a front ferrule which is receivable coaxially over the tubing end. An externally-threaded nut is receivable coaxially over the outer diameter of the tubing end to be positionable thereon rearwardly of the front ferrule such that, with the tubing end and front ferrule being inserted through the bore opening, the nut is threadably engageable with the body urging an outer surface of the ferrule into a canning engagement against the body seating surface. The axial length of the seating surface is provided to extend substantially the entire length of the ferrule outer surface so as to constrain the radial outward expansion of the ferrule rearward end.

12 Claims, 4 Drawing Sheets

U.S. PATENT DOCUMENTS

| | | | |
|---|---|---|---|
| 3,695,647 A | | 10/1972 | Pugliese |
| 3,722,923 A | | 3/1973 | Grahl |
| 3,888,502 A | * | 6/1975 | Moreiras ............... 285/341 |
| 4,076,286 A | | 2/1978 | Spontelli |
| 4,304,422 A | * | 12/1981 | Schwarz ............... 285/4 |
| 4,619,473 A | * | 10/1986 | Someya ............... 285/353 |
| 4,776,618 A | | 10/1988 | Barree |
| 4,799,717 A | * | 1/1989 | Kingsford ............... 285/341 |
| 4,826,218 A | | 5/1989 | Zahuranec |
| 4,915,427 A | | 4/1990 | Zahuranec |
| 4,940,263 A | | 7/1990 | Mayernik |
| 5,074,599 A | | 12/1991 | Wirbel et al. |
| 5,351,998 A | | 10/1994 | Behrens et al. |
| 5,681,058 A | * | 10/1997 | Hwang ............... 285/133.4 |
| 5,882,050 A | | 3/1999 | Williams et al. |
| 5,934,714 A | | 8/1999 | Sugiyama et al. |
| 6,056,327 A | * | 5/2000 | Bouldin et al. ............... 285/93 |
| 6,247,731 B1 | * | 6/2001 | Stearns et al. ............... 285/353 |
| 6,345,845 B2 | * | 2/2002 | Johnston ............... 285/382.7 |

OTHER PUBLICATIONS

Parker–Hannifin Catalog 4230 for CPI™ Tube Fittings, Revised Feb., 2000.

Parker–Hannifin Catalog 4233 for A–LOK® Tube Fittings, Revised Oct. 1999.

Pamphlet for Swagelok Sno–Trik® Fittings for Heavy Wall Tubing. Applicants request the Examiner to consider this reference as prior art under 102(a), however, Applicants respectfully reserve the right to supplement this information Disclosure Statement and take a contrary position should it be necessary.

Hardiff by—Surface Treatment Technology, Applicants request the Examiner to consider this reference as prior art under 102 (a), however, Applicants respectfully reserve the right to supplement this Information Disclosure Statement and take a contrary position should it be necessary.

* cited by examiner

TUBE FITTING FOR MEDIUM PRESSURE APPLICATIONS

CROSS-REFERENCE TO RELATED CASES

The present application claims the benefit of the filing date of U.S. Provisional Application Ser. No. 60/338,369; filed Dec. 7, 2001, the disclosure of which is expressly incorporated herein by reference.

BACKGROUND OF THE INVENTION

The present invention relates generally to compression fittings for coupling the end of a length of tubing to another member, and more particularly to such a fitting which is of a ferruled-variety and which is particularly adapted for use with hardened or other tubing used in "medium" pressure applications.

Compression fittings of a ferruled-type are widely employed in a variety of instrumentation, pneumatic, hydraulic, process, power, refrigeration, and other fluid transport applications utilizing plastic or metal tubing. Typically employing one or two ferrules for gripping the tubing and forming a fluid-tight seal between the tubing and the fitting body, these fittings have been adapted for use as connectors with many different tubing types including plastics such as polyurethane (PU), polytetrafluoroethylene (PTFE), fluorinate ethylene polypropylene (FEP), perfluoroalkoxy resin (PFA), polyethylene (PE), polypropylene (PP), rigid and flexible nylon, acrylonitrile-butadiene-styrene (ABS) copolymer, and metals such as copper, brass, steel, stainless steel, titanium, aluminum, and alloys such as nickel-copper, Hastelloy®, Alloy 600, 6Mo, Inconel®, Incoloy®, and the like.

In basic construction, such fittings for use with metal tubing generally are formed from the same metal as the tubing (or in the case of copper tubing from brass) as including a body and one or more branches, ends, or other openings for connection to a tubing end. Often, these fittings are termed as being standard or inverted depending on the style of nut which is used in the fitting. Under such convention, "standard" nuts are internally-threaded for engagement with an externally-threaded body, with "inverted" nuts being externally-threaded threaded for engagement with an internally-threaded body. Tube fittings of the type herein involved are manufactured by the Instrumentation Connectors Division of Parker-Hannifin Corp., Huntsville, Ala., and are sold commercially under the tradename A-Lok® and CPI™. Other representative tube fittings of the type herein involved are described in U.S. Pat. Nos. 2,484,815; 2,749,152; 3,075,793; 3,103,373; 3,215,457; 3,402,949; 3,445,128; 3,499,671; 3,584,900; 3,695,647; 3,722,923; 4,076,286; 4,776,618; 4,826,218; 4,915,427; 4,940,263; 5,074,599; 5,351,998; 5,882,050; and 5,934,714.

Figure 1:
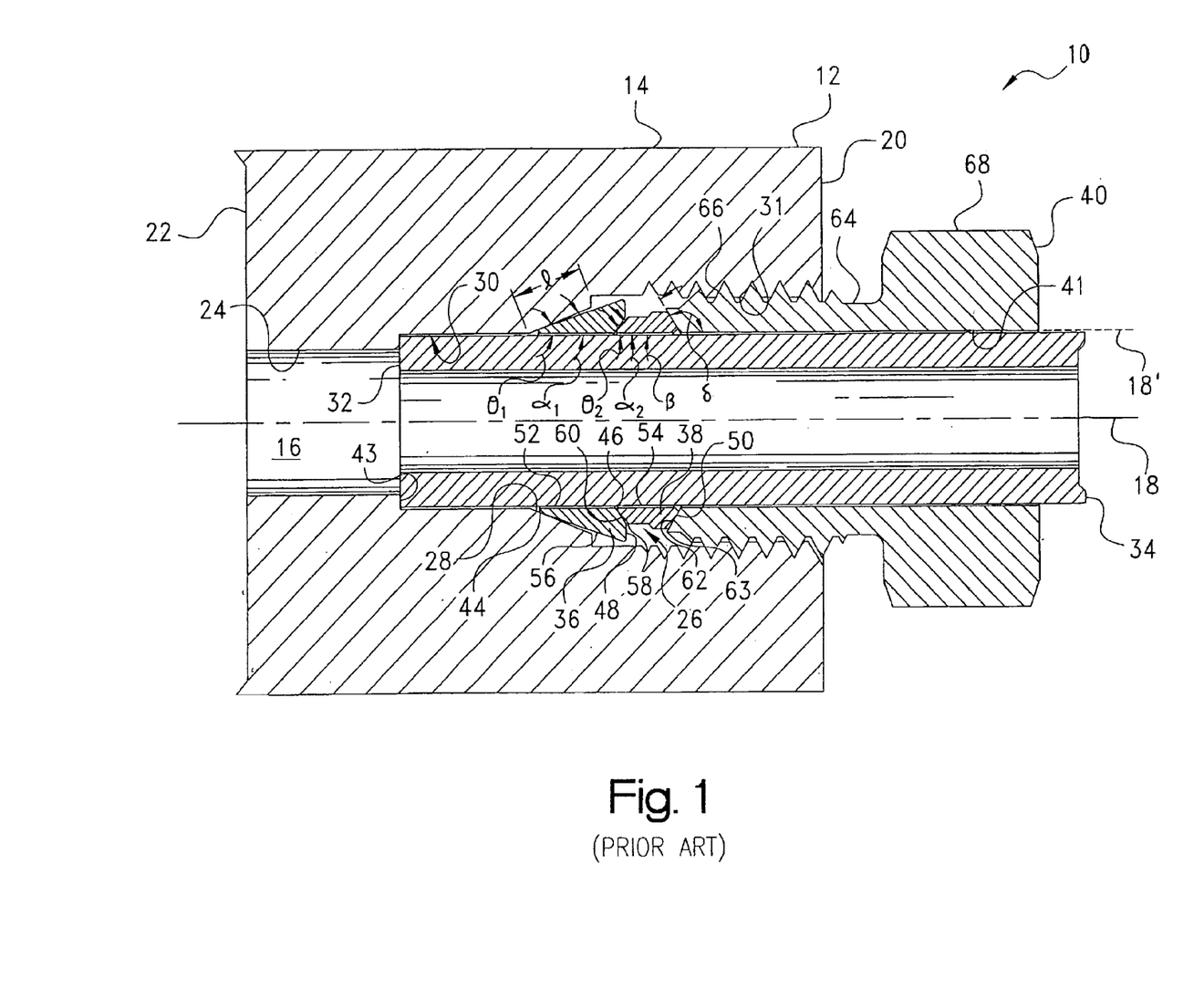
FIG. 1 is a side cross-sectioned view showing the assembly of an inverted tube fitting representative of the prior art with the end of a length of soft tubing.

A representative tube fitting of the above-mentioned inverted style is shown generally at 10 in FIG. 1 which is labeled "prior art." Such fitting 10 includes a body, 12, having an external surface, 14, and an internal bore, 16. Bore 16 extends coaxially with a central longitudinal axis, 18, which for convenience in the discourse to follow is transposed at 18'. Depending upon the configuration of the fitting 10, the body external surface 14 may be configured as having hexagonal or other flats portions for engagement with a wrench or other tool during make-up or disassembly. Also, and again as depending upon the configuration of the fitting 10, body 12 may extend in a "straight" configuration, such as for a union or a reducer or other adapter, along axis 18 intermediate a rearward end or port, 20, which may be configured in the manner to be described for a tubing connection, and a forward end, 22, which, although not shown as such, similarly may be configured for another tubing connection. Of course, and as is known, by providing body 12 as having ends or branches which are angled, or as having multiple ends or branches, configurations other than straight, such as elbows, tees, or crosses may be provided. Forward end 22 also may be configured instead for a male or female pipe, welded, or other connection. Alternatively, body 12 itself may be a manifold, valve, piston, or other component or structure. In the disclosure to follow, the axial directions along axis 18 will be referred to as "forward," "forwardly," or "front" if in the axial direction of the body forward end 22, and as "rearward," "rearwardly," or "rear" if in the counter axial direction of the body rearward end 20.

In the embodiment 10 of FIG. 1, bore 16, which has an inner circumferential surface, 24, is counterbored beginning from the body rearward end 20 and extends forwardly therefrom along axis 18 into body 12 in a stepwise fashion of generally decreasing diametric extent in defining a rearward opening, 26, an annular seating surface, 28, and a generally cylindrical tube support portion, 30. Opening 26, which is internally-threaded as shown at 31, is sized to accept a distal end, 32, of a length of tubing, 34, as such tubing end 32 is received coaxially through generally annular front and rear ferrules, 36 and 38, respectively, which may be preset onto the tubing outer diameter in a manner known in the art, and a generally annular, "inverted" nut, 40, having a generally cylindrical inner surface, 41. Seating surface 28 is sized for an abutting engagement with the front ferrule 36, and is configured as having a generally frusto-conical geometry which is inclined in the rearward direction along axis 18 to define a given angle, referenced at $\theta_1$, of typically about 20° as measured relative to axis 18 and/or the bore inner surface 24, and as having a given axial length, referenced at "1." Tube support portion 30, in turn, is sized to receive the tubing end 32 and in that regard has an inner diameter which is marginally larger than the tubing 34 outer diameter for a close tolerance fit therewith. The travel of tubing end 32 into the bore 16 may be delimited by a positive axial stop provided by the abutting engagement of the tubing end 32 against a rearward-facing wall, 43, of a generally-annular internal shoulder defined by the forward terminus of the tube support portion 30.

Ferrules 36 and 38 are provided to compressively grip or "bite" the tubing 34 outer diameter both for retaining the tubing end 32 within the body 12 and for effecting a fluid-tight seal therebetween. Each of the ferrules 36 and 38 extends intermediate a forward end or nose, 44 and 46, respectively, and a rearward end, 48 and 50, respectively, and has a generally cylindrical inner surface, 52 and 54, respectively. A forward outer surface, 56 and 58, respectively, extends rearwardly from the corresponding nose 44 or 46, and is configured as having a generally frustoconical geometry which is inclined in the rearward direction along axis 18 to define a given included angle, referenced respectively at $\alpha_1$ and $\alpha_2$, with the axis 18 and/or the corresponding inner surface 52 or 54 of typically about 15° for $\alpha_1$, and between about 35–45° for $\alpha_2$. The forward outer surface 56 of the front ferrule 36 thereby defines a differential angle of about 5° with the confronting body seating surface 28 such that a camming action is developed as the front ferrule 36 is urged into abutting engagement against the seating surface 28 during the makeup of the fitting 10. Similarly, the forward outer surface 58 of the rear ferrule 38 defines a differential angle of from about 1–10° with a confronting seating surface, 60, formed in the front ferrule rearward end 48 as extending generally from the ferrule inner surface 52. Further in this regard, seating surface 60 is configured as having a generally frustoconical geometry which is rearwardly inclined to define a given included angle, referenced at $\theta_2$, with the axis 18 of typically about 45°.

The rearward end 50 of the rear ferrule 38 also has a generally frustoconical geometry, but as inclined in the forward direction along axis 18 in defining an included angle, referenced at β, of about 75°, with the ferrule inner surface 54 and/or the axis 18. During the makeup of the fitting 10, such end 50 is abutting engageable in an axial force transferring contact with a generally frustoconical thrust surface, 62, formed at the forward end, 63, of nut 40. Typically, the thrust surface 62, which is also forwardly inclined is configured as the supplement of angle β, and in this regard defines an included angle, referenced at δ, of about 105° with the nut inner surface 41 and/or axis 18. Nut 40 further is configured as having a having forward portion, 64, which is externally-threaded as shown at 66, and a rearward portion, 68, which may be configured as having hexagonal or other flats for engagement with a wrench or other make-up tool.

In the makeup of the fitting 10, with the tubing end 32 received coaxially through, in series, nut 40, rear ferrule 38, and front ferrule 36, and with the ferrules 36 and 38 optionally preset thereon, the tubing end 32 and ferrules 36 and 38 may be received through the opening 26 and into bore 16, with the advancement thereof being delimited by the abutting engagement of the tubing end 32 against the shoulder wall 43 of the body tube support portion 30. Thereupon, the external threads 66 of the nut forward portion 64 may be threadably rotatably engaged with the internal threads 31 of the body opening 26 urging, by means of the tightening of the nut 40 and the concomitant axial force transferring contact of the nut thrust surface 62 against the rear ferrule rearward end 50, the rear ferrule forward outer surface 58 into a camming engagement with the confronting seating surface 60 of the front ferrule rearward end 48 and, in turn, the front ferrule forward outer surface 56 into camming engagement with the confronting body seating surface 28. As the tightening of the nut 40 progresses, such as to a specified torque, displacement, or rotation setting, the ferrule noses 44 and 46 are compressed radially inwardly about the tubing outer diameter both to grippably retain the tubing end 32 in the fitting body 12 and to develop a fluid-tight, metal-to-metal seal between the front ferrule forward outer surface 56 and the body seating surface 28, and between one or both of the ferrule noses 44 and 46 and the outer diameter of the tubing 34. For improved gripping of the tubing, rear ferrule 38 may be surface or case hardened, such as to a Rockwell (Rc) hardness of at least about 50, by a chemical process such as nitriding, carburizing, case carburization, or Kolsterizing, or by a heat treatment or other heat treatment method such as precipitation hardening, work hardening, or a surface coating or plating.

As the use of tubing continues to increase for chemical process and other applications, it will be appreciated that improvements in tube fittings therefor would be well-received by industry. It is believed that there presently exists a need for a fitting for use with thicker walled, i.e., between about 0.062–0.21 inch (1.5–5 mm), and non-annealed, harder, i.e., at least about 20 Rc, tubing for use at "medium" working pressures of between about 10–15 Ksi (70–100 KPa). Although fittings are currently available which are specified for use in "medium" pressure applications, these fittings generally are of a "non-standard" variety in requiring additional components or makeup steps. Accordingly, it is believed that particularly desired would be a fitting which employs standard componentry and which may be made or disassembled in a conventional fashion so as to have a familiarity to technicians and other involved in the installation or maintenance of the tubing system.

Figure 2:
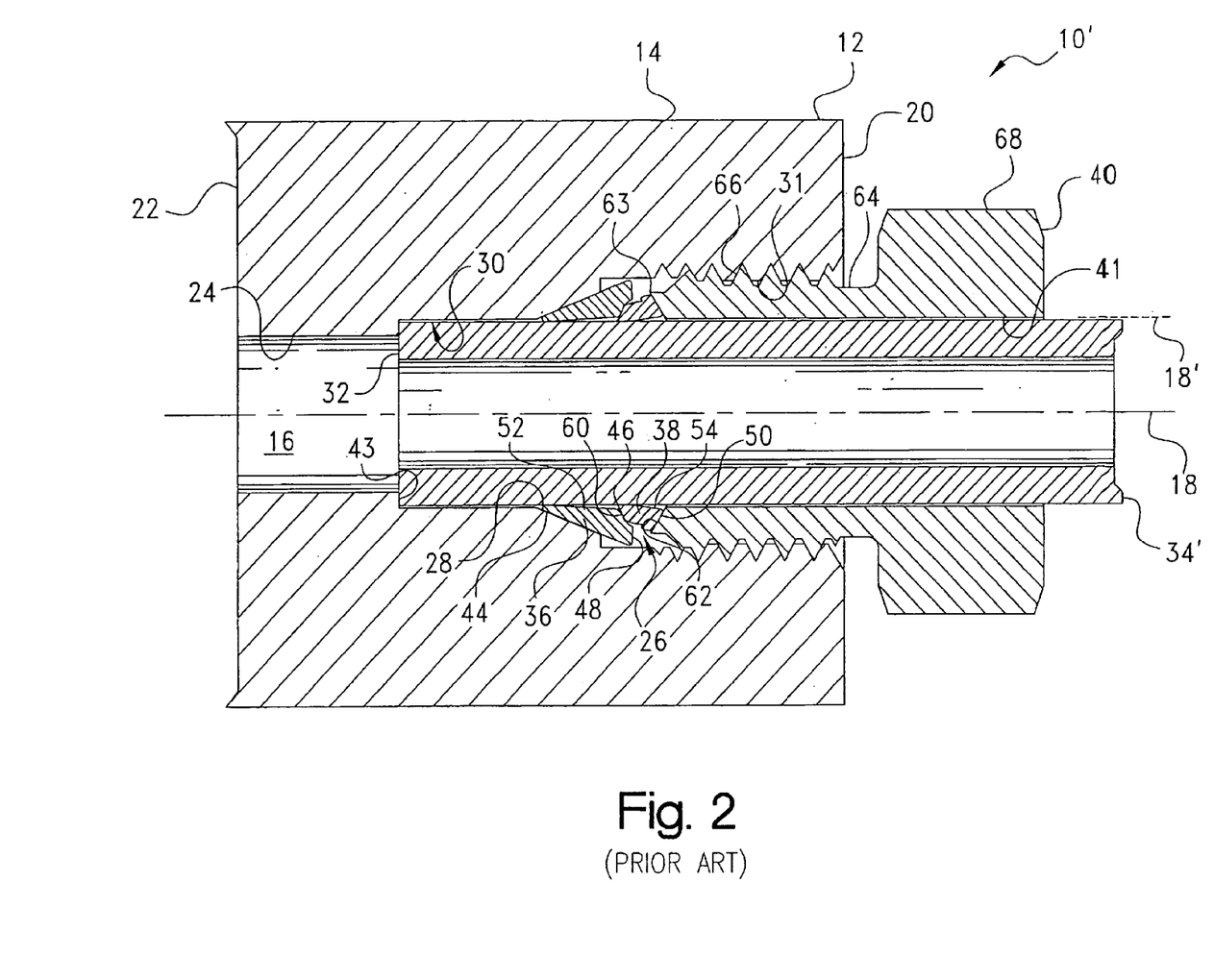
FIG. 2 is a side cross-sectional view showing the makeup of the fitting of FIG. 1 when used with hard tubing.

In this regard, however, fittings of a conventional design which are currently used with softer, annealed tubing used in instrumentation and other applications at lower operating pressure of up to about 10 Ksi (70 KPa), cannot simply be resized for use with tubing which may be as hard as the ferrules of the fitting itself For example, reference may be had to FIG. 2 wherein fitting 10 of FIG. 1 reappears at 10' as made up with "medium" pressure tubing which is designated at 34'. As may be seen, the use of a fitting designed for softer, annealed tubing with harder tubing can result in a condition wherein the ferrules 36 and 38, rather than being cammingly compressed in a controlled fashion about the tubing outer diameter, instead are caused to flare outwardly with, particularly, the end 48 of the front ferrule 36 being expanded to an outer diameter which could interfere with the body internal threads 31 and thereby delimit the removal of the tubing end 32' from the body 12 during disassembly. Thus, a preferred fitting for medium pressure tubing would allow for a conventional makeup and disassembly, as for fitting 10, but also would be specially design for such tubing in minimizing the potential for ferrule flaring or other assembly problems.

SUMMARY OF THE INVENTION

The present invention is directed, broadly, to fittings for "medium" pressure tubing. More particularly, the invention is directed to a fitting of a conventional variety as fitting 10 of FIG. 1, but which is adapted particularly for use with non-annealed or other hard or higher pressure tubing.

In an illustrated embodiment of the fitting construction of the present invention, the body is configured as having a seating surface which extends substantially the full length of the of the front ferrule, and which may terminate to define a radial stop having a diametric extent which is less than that of the inner surface of the internally-threaded body rearward opening. In this way, the front ferrule is constrained so as to delimit the radial outward flaring thereof In addition, the differential angle between the front ferrule outer surface and the body seating surface may be decreased to assist in the constrainment of the ferrule.

The present invention, accordingly, comprises the arrangement possessing the construction, combination of elements, and arrangement of parts which are exemplified in the detailed disclosure to follow. Advantages of the invention include a fitting construction which uses conventional componentry to allow for assembly and disassembly in a familiar fashion, but which is particularly adapted for used in "medium" pressure applications, or otherwise with harder tubing.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "vertical" and "axial" or "horizontal" referring, respectively, to directions or planes perpendicular and parallel to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, or planes perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For the illustrative purposes of the discourse to follow, the precepts of the fitting construction of the present invention are described in connection with a "straight" configuration such as for a union or coupling. It will be appreciated, however, that aspects of the present invention will find application in other fitting configurations, such as tees, elbows, and crosses, and as port connections for valves, cylinders, manifolds, sensors, and other fluid components. Use within those such other configurations and components therefore should be considered to be expressly within the scope of the invention herein involved.

Figure 3:
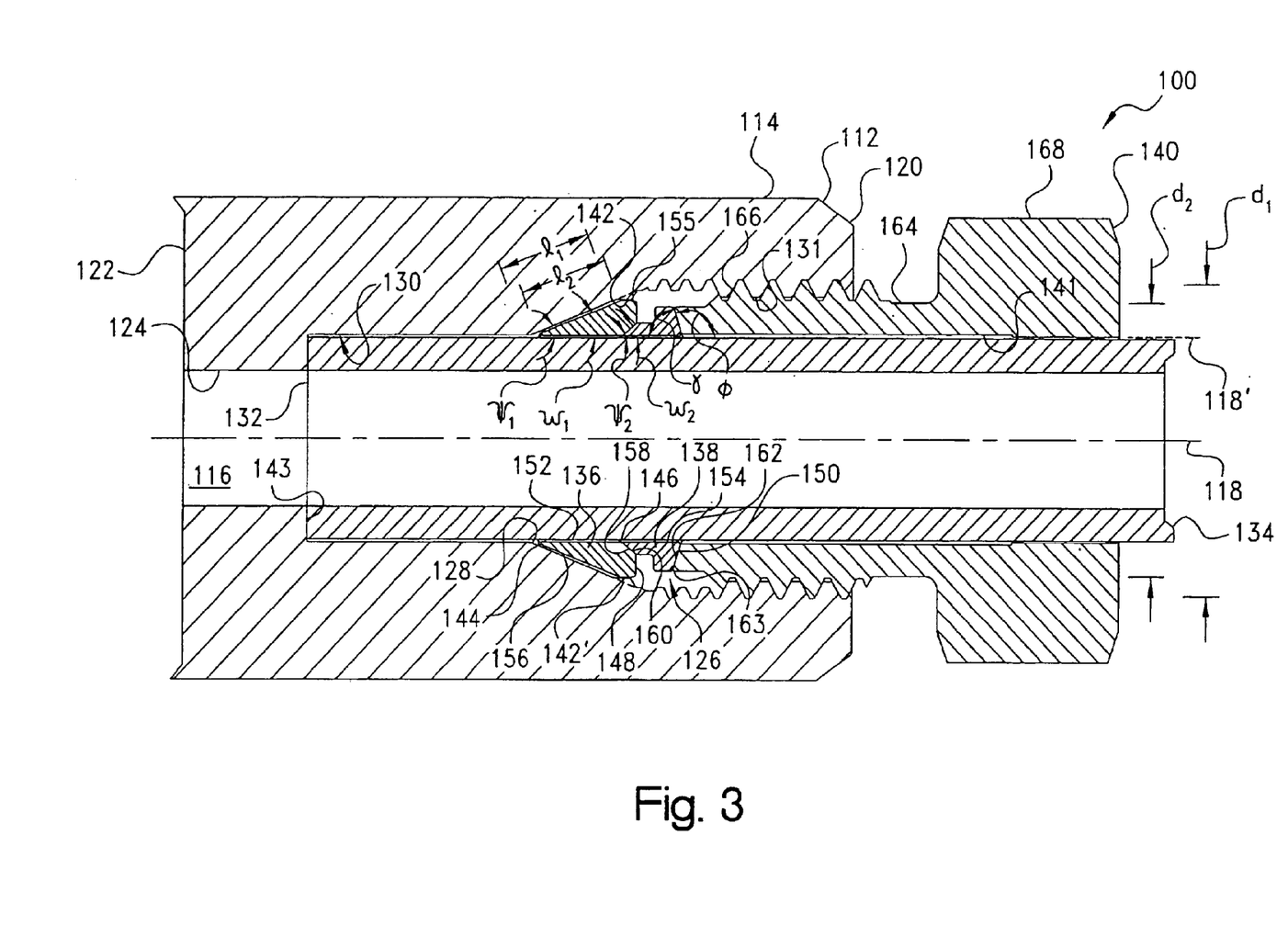
FIG. 3 is a side cross-sectional assembly view of a representative "inverted" fitting construction according to the present invention for use with hard tubing.

Referring then to the figures wherein corresponding reference characters are used to designate corresponding elements throughout the several views with equivalent elements being referenced with prime or sequential alphanumeric designations, an inverted fitting configuration in accordance with the present invention is shown generally at 100 in the longitudinal cross-sectional view of FIG. 3. As may be seen, fitting 100 is of the same general construction as fitting 10 of FIG. 1, but as modified in the manner which is detailed hereinafter.

In this regard, fitting 100 includes a body, 112, having an external surface, 114, and an internal bore, 116, which extends coaxially with a central longitudinal axis, 118. Depending upon the configuration of the fitting 100, as with fitting 10 of FIG. 1, the body external surface 114 may be configured as having hexagonal or other flats portions for engagement with a wrench or other tool during make-up or disassembly. Also, and again as depending upon the configuration of the fitting 100, body 112 may extend in a "straight" configuration, such as for a union or a reducer or other adapter, along axis 118 intermediate a rearward end or port, 120, which may be configured in the manner to be described for a tubing connection, and a forward end, 122, which, although not shown as such, similarly may be configured for another tubing connection. Of course, and as is known, by providing body 112 as having ends or branches which are angled, or as having multiple ends or branches, configurations other than straight, such as elbows, tees, or crosses may be provided. Forward end 122 also may be configured instead for a male or female pipe, welded, or other connection. Alternatively, body 112 itself may be a manifold, valve, piston, or other component or structure. As before, in the following discourse, the axial directions along axis 118 again will be referred to as "forward," "forwardly," or "front" if in the direction of or towards or adjacent the body forward end 122, and as "rearward," "rearwardly," or "rear" if in the counter direction of or towards or near the body rearward end 120.

In the embodiment 100 of FIG. 3, bore 116, which has an inner circumferential surface, 124, is counterbored beginning from the body rearward end 120 and extends forwardly therefrom along axis 118 into body 112 in a stepwise fashion of generally decreasing diametric extent in defining a rearward opening, 126, of a given diametric extent, referenced at $d_1$, through the body rearward end 120, an adjoining annular seating surface, 128, and an adjoining, generally cylindrical tube support portion, 130. Opening 126, which is internally-threaded as shown at 131, is sized to accept a distal end, 132, of a length of tubing, 134, as such tubing end 132 is received coaxially through at least a generally annular front ferrule, 136 and, preferably, also through a generally annular rear ferrule, 138, each of which may be preset onto the tubing outer diameter in a manner known in the art, and further through a generally annular, "inverted" nut, 140, having a generally cylindrical inner surface, 141. For many application involving "medium" working pressures of between about 10–15 Ksi (70–100 KPa), tubing 134 will be specified to be a non-annealed stainless steel having an outer diameter of between about 0.25–1 inch (3–25 mm), a wall thickness of between about 0.062–0.21 inch (1.5–5 mm), and a hardness of at least about 20 Rc. For such tubing, body 112 may be provided in sizes ranging from size 4 (¼-inch, 6 mm) through size 16 (1-inch, 25 mm) or larger. As mentioned, body 132 and the other fitting components may be formed of the same or generally the same, i.e., brass for copper tubing, material as the tubing itself, with such material typically being selected for strength, corrosion or temperature resistance, or other physical or mechanical property, or otherwise for chemical compatibility with the service environment or with the fluid being handled. Such fluid most often will be a liquid such as water, hydraulic oil, or a process stream, but alternatively may be air or another gas.

Seating surface 128 is sized for an abutting engagement with the front ferrule 136, and is configured as having a generally frustoconical geometry which is inclined in the rearward direction along axis 118 to define a given angle, referenced at $\psi_1$, of typically about 20° as measured relative to axis 118 and/or the bore inner surface 124, and as having a given axial length, referenced at "$l_1$." Seating surface 128 may be provided to end at a rearward terminus configured to define an adjoining, generally annular, radial stop surface, 142, which is shown to be generally parallel in the axial direction to axis 118 and which extends radially circumferentially about axis 118 in having a diametric extent, referenced at $d_2$, which is at least marginally smaller than the diametric extent $d_1$ of the body rearward opening 126. Stop surface 142 also may be provided as an inflection in seating surface 128 surface so as to define an inwardly-tapered, acute angle with the horizontal. Alternatively, and is shown at 142', the surface may be eliminated with the seating surface instead continuing generally to the internally-threaded inner surface 131 of the opening 126.

Tube support portion 130, in turn, is sized to receive the tubing end 132 and in that regard has an inner diameter which is marginally larger than the tubing 134 outer diameter for a close tolerance fit therewith. The travel of tubing end 132 into the bore 116 may be delimited by a positive axial stop provided by the abutting engagement of the tubing end 132 against a rearward-facing wall, 143, of a generally-annular internal shoulder defined by the forward terminus of the tube support portion 130.

Ferrules 136 and 138 are provided to compressively grip or "bite" the tubing 134 outer diameter both for retaining the tubing end 132 within the body 112 and for effecting a fluid-tight seal therebetween. In that regard, both of the ferrules 136 and 138 may be surface or case hardened, such as to a hardness of at least about 50 Rc, by a chemical process such as nitriding, carburizing, case carburization, or Kolsterizing, or by heat treatment or other heat treatment method such as precipitation hardening, work hardening, or a surface coating or plating. Additionally, the surfaces of the rear ferrule 138, and also of the nut 140, may be coated, such as by a chemical solution plating or another means such as a physical or chemical vapor deposition, with molybdenum disulfide, silver or other lubricious material to reduce the required assembly torque and/or the potential for galling.

Each of the ferrules 136 and 138 extends intermediate a forward end or nose, 144 and 146, respectively, and a rearward end, 148 and 150, respectively, and has a generally cylindrical inner surface, 152 and 154, respectively. The front ferrule rearward end 148 also has a rearward outer surface, 155, which extends radially circumferentially about axis 118.

A forward outer surface, 156 and 158, respectively, extends rearwardly from the corresponding nose 144 or 146, and is configured as having a generally frustoconical geometry which is inclined in the rearward direction along axis 118 to define a given included angle, referenced respectively at $\omega_1$ and $\omega_2$, with the axis 118 and/or the corresponding inner surface 152 or 154 which may be about 17° for $\omega_1$ and between about 35–45° for $\omega_2$. The forward outer surface 156 of the front ferrule 136 thereby may define a differential angle of about 3° or less with the confronting body seating surface 128 such that a camming action is developed as the front ferrule 136 is urged into abutting engagement against the seating surface 128 during the makeup of the fitting 100.

However, as compared to the 5° differential angle which heretofore was believed to be conventional in the art, a smaller differential angle has been observed to assist, or in conjunction with the radial stop surface 142 which may be radially abuttingly engaged by the rearward outer surface 155 of the front ferrule rearward end 148, in constraining the compression of the front ferrule 136 about the tubing outer diameter, and thereby to mitigate the potential for the ferrule rearward end 148 to flare when the ferrule nose 144 grippably engages hard tubing. Moreover, and as is shown, the axial length $l_1$ of the body seating surface 128 may be sized relative to the axial length, referenced at $l_2$, of the front ferrule outer surface 156 to extend substantially the entire length thereof to further assist in constraining the ferrule 136.

In a manner similar to the front ferrule outer surface 156 and as shown in FIG. 1 for the surfaces 58 and 60 of the fitting 10, the angle $\omega_2$ of the rear ferrule outer surface 158 may define a differential angle of from about 1–10° with a confronting seating surface, 160, formed in the front ferrule rearward end 148 as extending generally from the ferrule inner surface 152. In this regard, seating surface 160 is configured as shown as having a generally frustoconical geometry which is rearwardly inclined to define a given angle, referenced at $\psi_2$, with the axis 118 of generally about 45°. Preferably, however, and as is shown in FIG. 3, the angles $\psi_2$ and $\omega_2$ may be about the same with each being about 45°.

The flanged rearward end 150 of rear ferrule 138 also has a generally frustoconical geometry, but as inclined in the forward direction along axis 118 in defining an acute included angle, referenced at $\gamma$, of between about 75–90°, with the ferrule inner surface 154 and/or the axis 118. During the makeup of the fitting 100, such end 150 is abutting engageable in an axial force transferring contact with a generally frustoconical thrust surface, 162, formed at the forward end, 163, of nut 140. Typically, the thrust surface 162, which is also forwardly inclined is configured as the supplement or about the supplement of angle $\gamma$, and in this regard defines an obtuse included angle, referenced at $\phi$, of between about 90–105° with the nut inner surface 141 and/or axis 118. Nut 140 further is configured as having a having forward portion, 164, which is externally-threaded as shown at 166, and a rearward portion, 168, which may be configured as having hexagonal or other flats for engagement with a wrench or other make-up tool. It will be appreciated that, as compared to a non-inverted, i.e., internally-threaded, nut, the use of the inverted nut 140 of the present invention provides additional support along the elongated axial extent of the inner surface 141, and particularly at the nut rearward portion 168, for the tubing end 132 and a correspondingly improved resistance to vibrational and other loadings on the which the tubing 134.

Figure 4:
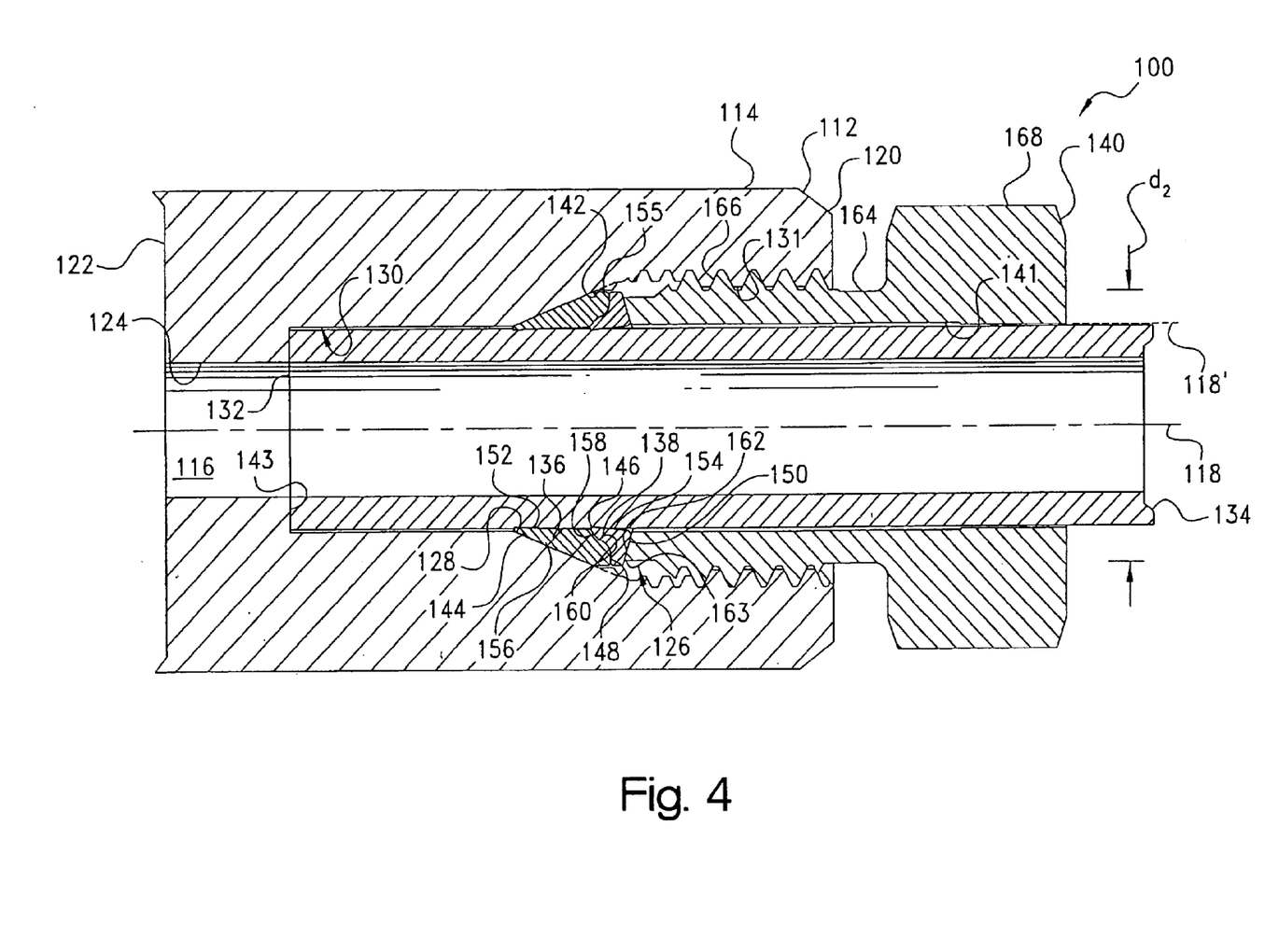
FIG. 4 is a side cross-sectional view the fitting and tubing of FIG. 3 as assembled.

In the makeup of the fitting 100, and as may be appreciated best with referenced to the assembled view of FIG. 4, with the tubing end 132 received coaxially through, in series, nut 140, rear ferrule 138, and front ferrule 136, and with the ferrules 136 and 138 optionally preset thereon, the tubing end and ferrules may be received through the opening 126 and into bore 116, with the advancement thereof being delimited by the abutting engagement of the tubing end 132 against the shoulder wall 143 of the body tube support portion 130. Thereupon, the external threads 166 of the nut forward portion 164 may be threadably rotatably engaged with the internal threads 131 of the body opening 126 urging, by means of the tightening of the nut 140 and the concomitant axial force transferring contact of the nut thrust surface 162 against the rear ferrule rearward end 150, the rear ferrule forward outer surface 158 into a camming engagement with the confronting seating surface 160 of the front ferrule rearward end 148 and, in turn, the front ferrule forward outer surface 156 into camming engagement with the confronting body seating surface 128. As the tightening of the nut 140 progresses, such as to a specified torque, displacement, or rotation setting, the ferrule noses 144 and 146 are compressed radially inwardly about the tubing outer diameter both to grippably retain the tubing end 132 in the fitting body 112 and to develop a fluid-tight, metal-to-metal seal between the front ferrule forward outer surface 156 and the body seating surface 128, and between one or both of the ferrule noses 144 and 146 and the outer diameter of the tubing 134.

However, by virtue of the provision of the body radial stop surface 142 which may be contacted by the rearward outer surface 155 of the front ferrule rearward end 148, the reduced differential angle between the body seating surface 126 and the ferrule outer and 156, and/or the increased axial length $l_1$ of the body seating surface 128 providing contact along substantially the full length $l_2$ of the ferrule outer surface 156, the deformation of the forward ferrule 136 is constrained insofar as substantial radial outward flaring of the ferrule rearward end 148 is delimited at least to no greater than the diametric extent $d_2$ of the stop surface 142. The fitting construction 100 of the present invention accordingly assures both reliable connection makeup even when used with non-annealed, hard tubing, and reliable disconnection insofar as the potential for interference between the body threads 131 and the front ferrule rearward end 148 is eliminated or at least substantially reduced.

Thus, a unique inverted fitting construction for hard tubing is described herein which assures proper assembly without the necessity of special components or additional makeup steps. Rather, such construction advantageously employs componentry which is standard in the field, and the use of which is readily familiar to most technicians and other personnel involved with the installation or maintenance of tubing systems.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A fitting assembly for the connection of a distal end of a length of tubing having an outer diameter, said assembly comprising:

a body having an internal bore for receiving the tubing end coaxially therethrough, the bore extending in a forward axial direction along a central longitudinal axis from an opening through the body to a generally frustoconical seating surface extending radially about the axis to a stop wall against which the tubing end abuts, the opening having an internally-threaded inner surface and being sized to receive the tubing end coaxially therethrough, and the seating surface formed as a surface of the body and having a given axial length, $l_1$, and being inclined in a rearward axial direction opposite the forward axial direction to define a given angle, $\psi_1$, with the axis;

a generally annular front ferrule receivable coaxially over the outer diameter of the tubing end and insertable with the tubing end through the bore opening, the front ferrule having a forward end and a rearward end, and a generally frustoconical forward outer surface extending from the forward end, the forward outer surface having a given axial length, $l_2$, and being inclined in the rearward axial direction to define a given included angle, $\omega_1$, with the axis, said angle $\omega_1$ being less than the angle $\psi_1$ of the body seating surface to define a given differential camming angle therebetween, the axial length $l_1$ of the body seating surface extending substantially the entirety of the axial length $l_2$ of the front ferrule forward outer surface, the front ferrule rearward end being formed as including a generally frustoconical seating surface extending radially about the axis, the seating surface being inclined in the rearward axial direction; and a generally annular rear ferrule receivable coaxially over the outer diameter of the tubing end and insertable with the tubing end through the bore opening, the rear ferrule having a forward end and a rearward end, and a generally frustoconical forward outer surface extending from the forward end and being inclined in the rearward axial direction; and a generally annular nut receivable coaxially over the outer diameter of the tubing end to be positionable thereon rearwardly of the front ferrule, the nut having an externally-threaded forward portion configured to be threadably engageable with the internally-threaded body inner surface, whereby with the front ferrule, the rear ferrule, and the nut received coaxially over the tubing end outer diameter and the nut positioned rearwardly of the front ferrule and the rear ferrule positioned intermediate the front ferrule and the nut, and with the tubing end and front ferrule being inserted through the bore opening and the nut externally threaded forward portion threadable engaged with the internally threaded body inner surface urging the front ferrule forward outer surface into a camming engagement against the body seating surface effecting a generally fluid-tight seal therewith and effecting a radially gripping compression of the front ferrule forward end about the tubing outer diameter retaining the tubing end within the body, and urging the rear ferrule forward outer surface into a camming engagement against the forward ferrule seating surface effecting a generally fluid-tight seal therewith and effecting a radially gripping compression of the rear ferrule forward end about the tubing outer diameter further retaining the tubing end within the body, and whereby as the front ferrule forward outer surface is urged into a camming engagement against the body seating surface, substantial radial outward expansion of the front ferrule rearward end is constrained by the front ferrule forward outer surface being engageable along substantially the entirety of the axial length $l_2$ thereof against the axial length $l_1$ of the body seating surface.

2. The fitting assembly of claim 1 wherein the differential angle between the body seating surface and the front ferrule forward outer surface is about 30° or less.

3. The fitting assembly of claim 2 wherein the body opening has a given diametric extent, $d_1$; and the body seating surface ends at a rearward terminus configured to define a generally annular radial stop surface extending circumferentially about the axis and having a diametric extent, $d_2$, at least marginally smaller than the diametric extent $d_1$ of the body opening, whereby as the front ferrule forward outer surface is urged into a camming engagement against the body seating surface, substantial radial outward expansion of the front ferrule rearward end is further constrained by the end being contactible against the radial stop surface.

4. The fitting assembly of claim 1 wherein the tubing is formed of a metal material having a hardness of at least about 20 Rc.

5. The fitting assembly of claim 1 wherein the front ferrule is formed of a metal material and is surface hardened to at least about 50 Rc.

6. The fitting assembly of claim 1 wherein:

the tubing is formed of a first metal material having a hardness of at least about 20 Rc; and the front ferrule is formed of a second metal material the same as or different from the first material and is surface hardened to at least about 50 Rc.

7. The fitting assembly of claim 1 wherein:

the front ferrule seating surface defines a given angle, $\psi_2$, with the axis; and the rear ferrule forward outer surface defines a given included angle, $\omega_2$, with the axis.

8. The fitting assembly of claim 7 wherein the angle $\omega_2$ of the rear ferrule outer surface is less than the angle $\psi_2$ of the front ferrule seating surface to define a given differential camming angle therebetween, said differential angle being between about 1–10°.

9. The fitting assembly of claim 7 wherein the angle $\omega_2$ of the rear ferrule outer surface and the angle $\psi_2$ of the front ferrule seating surface are about equal.

10. The fitting assembly of claim 1 wherein:

the tubing is formed of a first metal material having a hardness of at least about 20 Rc; and the rear ferrule is formed of a second metal material the same as or different from the first material and is surface hardened to at least about 50 Rc.

11. The fitting assembly of claim 1 wherein:

the nut has a forward end including a thrust surface; and as the nut externally-threaded forward portion is threadably engaged with the internally-threaded body inner surface, the nut thrust surface is abuttingly engageable in axial force transmitting contact with the rear ferrule rearward end urging the rear ferrule forward outer surface end into its camming engagement with the forward ferrule seating surface and, in turn, urging the front ferrule forward outer surface into its camming engagement with the body seating surface.

12. The fitting assembly of claim 11 wherein:

the nut thrust surface is generally frustoconical and is inclined in the forward axial direction to define a given obtuse included angle, $\phi$, with the axis; and the rear ferrule rearward end is generally frustoconical and is inclined in the forward axial direction to a given acute included angle, $\gamma$, with the axis, said angle $\gamma$ and the angle $\phi$ of the nut thrust surface being about supplementary.

* * * * *